United States Patent [19]

Haak et al.

[11] 4,029,166
[45] June 14, 1977

[54] FINAL SPROCKET DRIVE FOR TRACK-TYPE VEHICLES

[75] Inventors: Willard J. Haak, Peoria; Howard A. Marsden, Pekin; Rollin P. Van Zandt, Peoria, all of Ill.

[73] Assignee: Caterpillar Tractor Co., Peoria, Ill.

[22] Filed: May 13, 1975

[21] Appl. No.: 577,135

[52] U.S. Cl. .................. 180/9.62; 74/766; 188/170

[51] Int. Cl.² ........................ B62D 55/12

[58] Field of Search ................ 180/9.62; 74/781 R, 74/785, 766, 767; 188/170

[56] References Cited

UNITED STATES PATENTS

| 1,489,384 | 4/1924 | Church | 74/391 |
|---|---|---|---|
| 2,702,603 | 2/1955 | Risk | 180/9.1 |
| 2,939,346 | 6/1960 | McCarthy | 74/301 |
| 2,978,051 | 4/1961 | Risk | 180/9.62 |
| 3,021,729 | 2/1962 | Chambers | 74/768 |
| 3,452,612 | 7/1969 | Casey | 74/391 |
| 3,459,070 | 8/1969 | Holdeman | 74/705 |
| 3,662,847 | 5/1972 | Skanes | 180/9.2 R |
| 3,721,135 | 3/1973 | Kelley | 74/766 |
| 3,800,901 | 4/1974 | Blomstrom | 180/9.62 |
| 3,831,718 | 8/1974 | Muller | 188/170 |

*Primary Examiner*—Joseph F. Peters, Jr.
*Assistant Examiner*—John A. Carroll
*Attorney, Agent, or Firm*—Phillips, Moore, Weissenberger, Lempio & Majestic

[57] ABSTRACT

A track-type vehicle comprises a track roller frame mounted on either side thereof and an endless track assembly mounted on each of the frames. Each frame further carries a final drive thereon, including at least one planetary gear set and a sprocket drivingly engaged with a respective track assembly. The power input to the final drive preferably comprises a hydrostatic motor for selectively driving a carrier of the planetary gear set which is attached to the sprocket for simultaneous rotation therewith.

20 Claims, 4 Drawing Figures

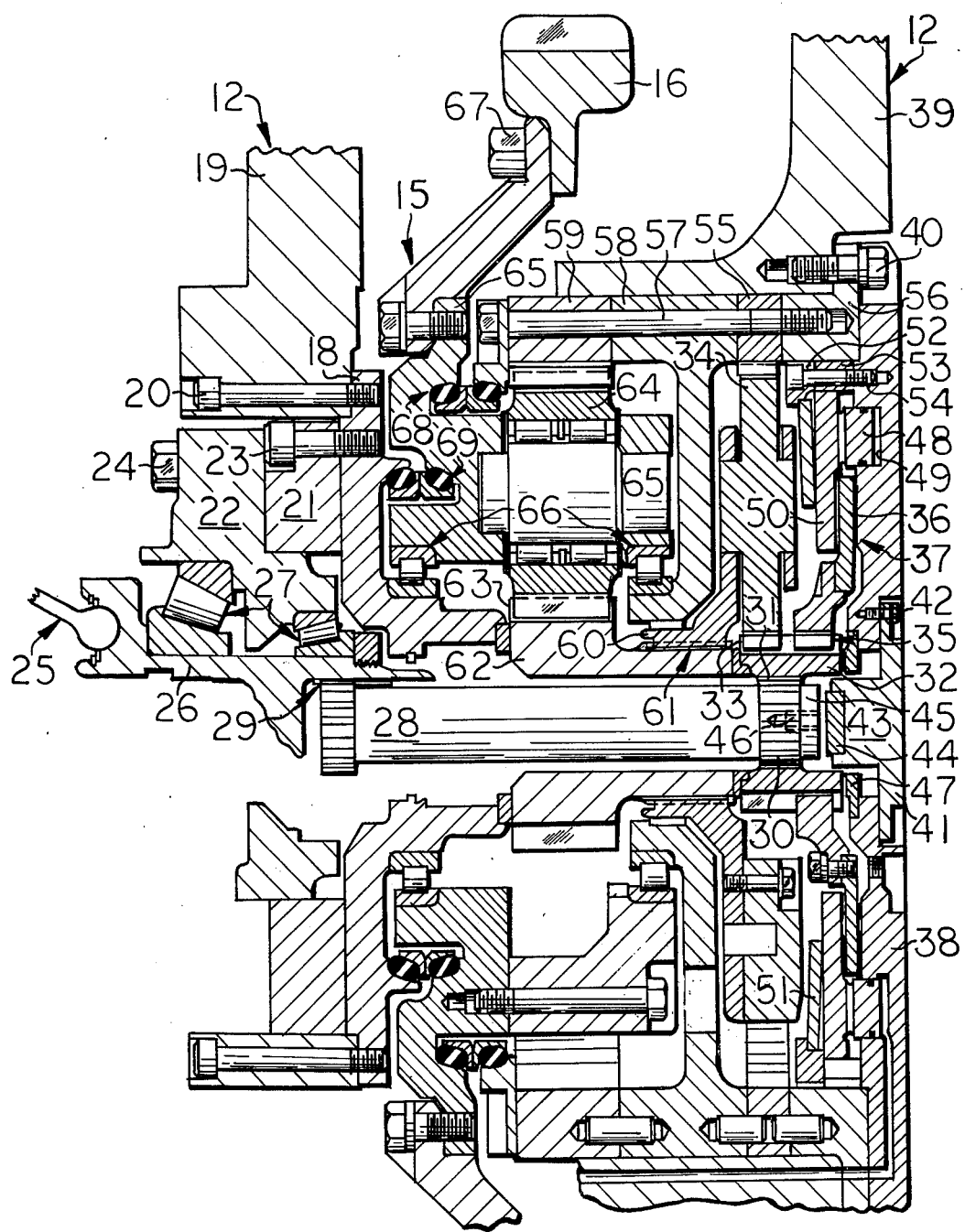
Fig_3_

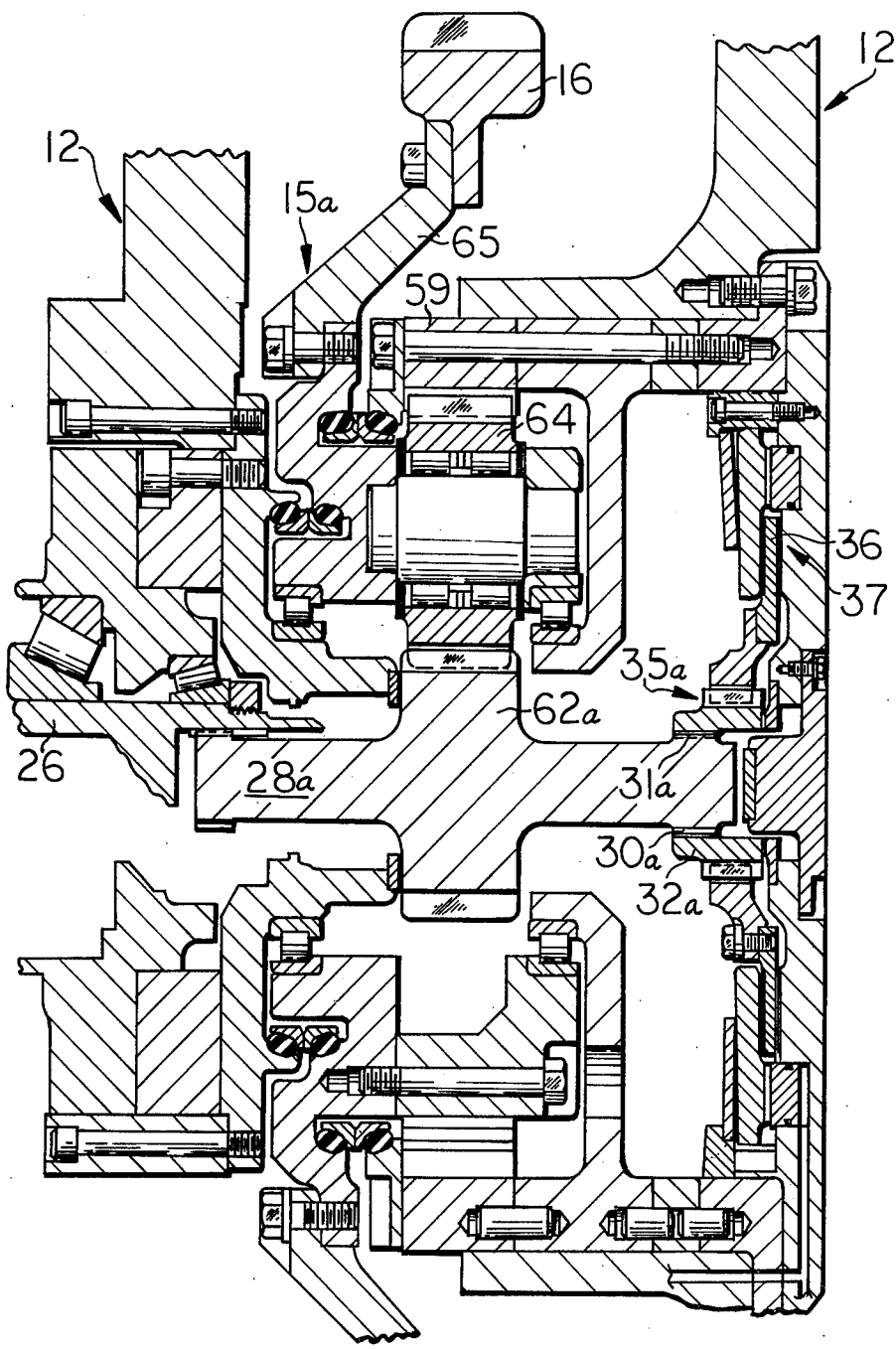
Fig_4

FINAL SPROCKET DRIVE FOR TRACK-TYPE VEHICLES

BACKGROUND OF THE INVENTION

The final drive for a track-type vehicle, such as a crawler tractor, comprises a power train operatively connected to a sprocket for driving an endless track assembly. The sprocket is normally rotatably mounted on the main frame of the vehicle, having a pair of track roller frames mounted on either side thereof, with each carrying an endless track assembly thereon.

The drive train comprises a pair of meshing bevel gears which provide a common drive input to the sprocket via suitably arranged steering clutches, planetary gear sets and attendant mechanisms. Examples of such final drives are disclosed in U.S. Pat. Nos. 2,702,603; 2,939,346; and 2,978,051, all assigned to the assignee of this application. Further examples of conventional power trains wherein the final drive is mounted on the track roller frame are disclosed in U.S. Pat. Nos. 3,744,331 and 3,771,627, also assigned to such assignee.

SUMMARY OF THIS INVENTION

An object of this invention is to provide a track-type vehicle with a compact and efficient final drive for each sprocket thereof. Each sprocket is rotatably mounted on a sub-frame mounted on a side of the vehicle for engagement with an endless track assembly mounted on the sub-frame. The final drive comprises at least one planetary gear set having an annular carrier rotatably mounted on the sub-frame and attached directly to the sprocket for simultaneous rotation thereof. The modular-type final drive is adapted to be assembled and disassembled expeditiously for servicing purposes, along with a brake assembly preferably employed therein and a hydraulic drive motor thereof.

BRIEF DESCRIPTION OF THE DRAWINGS

Further objects of this invention will become apparent from the following description and accompanying drawings wherein:

FIG. 3 is an enlarged sectional view of a first final sprocket drive embodiment; and FIG. 4 is a view similar to FIG. 3, but illustrating a second final sprocket drive embodiment of this invention.

DETAILED DESCRIPTION

Figure 1:
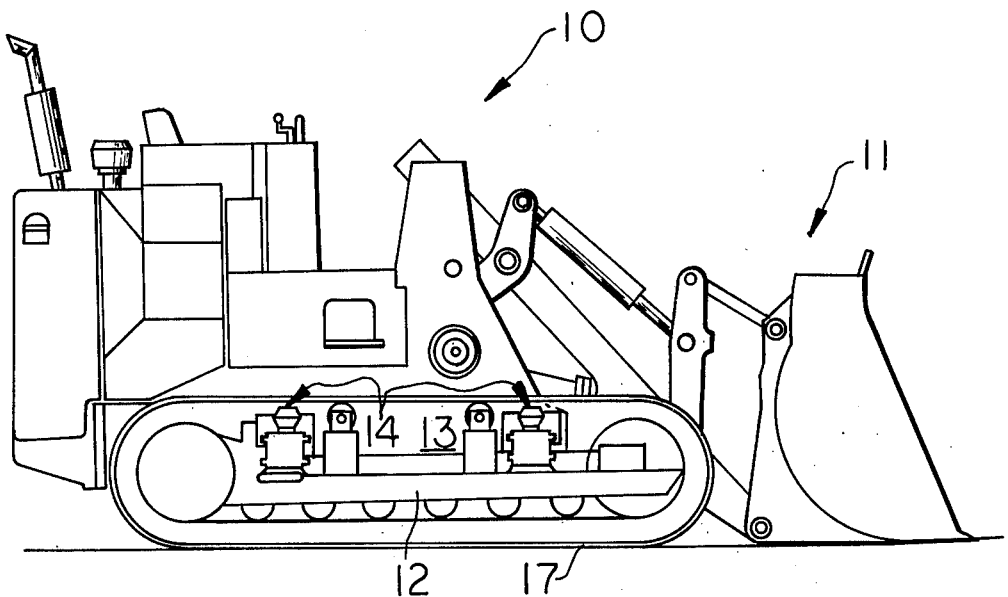
FIG. 1 is a side elevational view of a track-type tractor embodying the final sprocket drive of this invention therein.

FIG. 1 illustrates a track-type tractor 10 having a loader bucket assembly 11 mounted on a forward end thereof in a conventional manner. Although the final sprocket drive of this invention is hereinafter described in connection with such tractor, it should be understood that the invention is also applicable to other track-type vehicles, such as excavators and the like.

The tractor comprises a pair of track roller or sub-frames 12 (one shown) suitably mounted on either side of the vehicle. For example, each sub-frame may be mounted on a main frame 13 of the vehicle solely by a pair of resilient mounts 14 operatively interconnected between the two frames. Examples of such mounts are disclosed in U.S. Pat. application Ser. No. 438,665, filed on Feb. 1, 1974 by Robert J. Purcell et al for "Multidirectional Resilient Suspension For Vehicles" and now U.S. Pat. No. 3,923,111, issued on Dec. 2, 1975.

Figure 2:
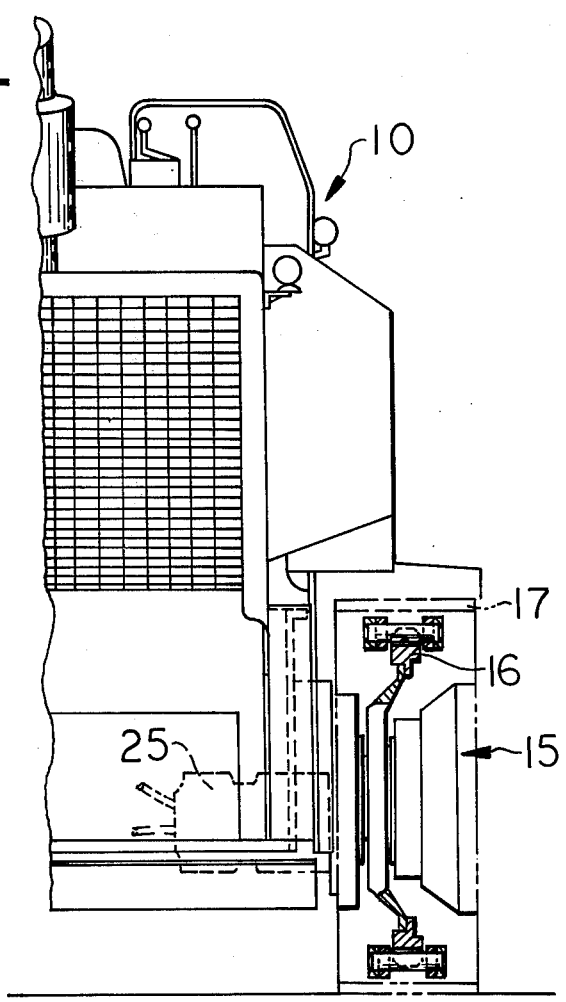
FIG. 2 is an enlarged rear elevational view of one-half of the tractor with portions thereof broken away to disclose the final sprocket drive.

FIGS. 2 and 3 illustrate a final drive means 15 operatively connected to a respective sprocket 16, adapted to engage an endless track assembly 17 suitably mounted on sub-frame 12. The final drive comprises an annular hub 18 suitably secured to an inboard rail 19 of the sub-frame by a plurality of circumferentially disposed bolts 20. A pair of annular members 21 and 22 are releasably attached to the hub by circumferentially disposed bolts 23 and 24, respectively, to further facilitate "modular" servicing of the final drive.

The power input to the final drive comprises a link-type hydraulic motor assembly 25, preferably of the variable displacement hydrostatic-type, comprising member 22 and an output shaft 26 (FIG. 3) rotatably mounted in an axially spaced pair of roller bearings 27 having their outer races secured to member 22. The modular-type motor assembly can thus be removed as a unit from the inboard side of frame 12 for servicing purposes. The outboard end of shaft 26 is attached to an input shaft 28 of final drive 15 at a spline connection 29. The outboard end of the input shaft has a spline 30 thereon which, in turn, engages with internally formed splines 31 of a gear 32.

Gear 32 has a second set of teeth 33 formed externally thereon to mesh with planetary gears 34 (one shown) to form the sun gear for a first planetary gear set. Teeth 33 further aid in forming a spline connection at 35 for carrying a friction disc 36 of a brake assembly 37. An annular cover plate 38 is releasably attached to an outboard rail 39 of sub-frame 12 by a plurality of circumferentially disposed bolts 40.

A plate 41 is releasably attached centrally of cover 38 by a plurality of cap screws 42 and has an annular projection 43 formed thereon to extend inwardly towards shaft 28. A thrust bearing 44 is secured on projection 43 in close opposition to an end 45 of shaft 28. A threaded hole 46 is formed in the end of the shaft to threadably receive a rod (not shown) for removal of the shaft for servicing purposes. A second annular thrust bearing 47 is secured on cover 38 to oppose the outboard end of gear 32.

Brake assembly 37 further comprises an annular piston 48 mounted in an annular cut-out formed in cover 38 which defines an actuating chamber 49 adapted to be selectively pressurized hydraulically by suitably arranged control means (not shown). An annular member or pressure plate 50 is formed integrally with the piston and a Belleville spring washer 51 which normally biases member 50 in an outboard direction to compress friction disc 36 to normally maintain the brake in an "on" condition of operation. The outer periphery of the spring is held in position by an annular seating member 52, attached to cover 38 along with a spacer 53 by a plurality of circumferentially disposed cap screws 54.

The final drive further comprises a first reaction ring gear 55 attached to an annular member 56 by a plurality of circumferentially disposed bolts 57 which further attach an annular support member 58 and a second reaction ring gear 59 to sub-frame 12. Planetary gear 34 is mounted for rotation on an annular first carrier 60 suitably splined at 61 to a second sun gear 62 of a second planetary gear set. The sun gear has a plurality of teeth 63 formed thereon which mesh with a second set of planetary gears 64 (one shown) which are, in turn, rotatably mounted on an annular second carrier 65. Planetary gears 64 further mesh with second reaction ring gear 59.

Second carrier 65 is rotatably mounted on hub 18 by a pair of roller bearing assemblies 66 having their inner races secured on the hub and support 58, respectively. Sprocket 16 is releasably attached to the second carrier by circumferentially disposed bolts 67. Standard ring seal assemblies 68 and 69 may be suitably mounted in the final drive, as shown in FIG. 3, to prevent the egress of lubricant thereby.

From the above description it can be seen that upon release of brake assembly 37 and selective actuation of motor 25 that rotation of shaft 28 will function to rotate sprocket 16 to drive track assembly 17 via the afore-described two planetary gear sets. In particular, rotation of shaft 28 will, in turn, rotate gear 32 to react planetary gears 34 against ring gear 55. In response thereto, first carrier 60 will rotate sun gear 62 and second planetary gears 64.

The second planetary gears react against ring gear 59 to rotate second carrier 65 and thus sprocket 16. Upon depressuration of actuating chamber 49 of the brake assembly to re-engage friction disc 36 between member 50 and cover 38, the planetary gear sets and attendant mechanisms will provide a substantial mechanical advantage for braking sprocket 16 during stopping of the tractor. It should be further noted that the planetary gear sets and brake assembly are situated on an outboard side of sprocket 16 to maintain the sprocket in a well-protected disposition within the sub-frame 12 and to facilitate servicing of the final drive.

FIG. 4 discloses a second final sprocket drive embodiment of this invention wherein corresponding constructions are depicted by identical numerals, but with numerals identifying modified constructions in FIG. 4 being accompanied by an "a". In essence, the FIG. 4 embodiment differs from that illustrated in FIG. 3 in that a final drive 15a comprises a single planetary gear set, including planetary gears 64 (one shown). Upon rotation of output shaft 26 of the hydraulic motor (not shown) an input shaft 28a to the final drive is rotated along with a sun gear 62a secured thereto.

Assuming release of normally on brake assembly 37, the sun gear will rotate planet gear 64 to react it against stationary ring gear 59 to rotate carrier 65 and sprocket 16 simultaneously. The outboard end of shaft 28a and its connection with brake assembly 37 have been modified slightly to compensate for the removal of the second planetary gear set and its attendant mechanisms. In particular, a pinion 30a is secured on the outboard end of shaft 28a and meshes with internal splines 31a of an annular coupling member 32a which is splined at 35a to friction disc 36 of the brake assembly.

We claim:

1. In a track-type vehicle of the type having a main frame, a sub-frame mounted on each side of said main frame and an endless track assembly mounted on said sub-frame, said sub-frame solely mounted on said main frame by resilient mounting means operatively interconnected between said main frame and said sub-frame and disposed forwardly of said sprocket towards a forward end of said vehicle for permitting independent movement of said sub-frame relative to said main frame, a sprocket rotatably mounted on said sub-frame and operatively engaged with said track assembly for selectively driving the same and a final drive means operatively connected to said sprocket for selectively rotating the same, said final drive means comprising at least one planetary gear set mounted on said sub-frame and having an annular carrier thereof rotatably mounted on said sub-frame and attached directly to said sprocket for rotation therewith.

2. The vehicle of claim 1 further comprising motor means mounted on an inboard side of said sub-frame and operatively connected to said final drive means.

3. The vehicle of claim 2 wherein said motor means constitutes a hydraulic motor.

4. The vehicle of claim 3 wherein said hydraulic motor constitutes a variable displacement hydrostatic motor.

5. The vehicle of claim 1 wherein said planetary gear set is mounted on an outboard side of said sprocket.

6. The vehicle of claim 1 further comprising normally emgaged braking means mounted on said sub-frame and operatively connected to said final drive means for selectively braking rotation of said sprocket through said planetary gear set.

7. The vehicle of claim 1 wherein said final drive means further comprises a ring gear fixedly attached to said sub-frame and wherein said planetary gear set comprises a plurality of circumferentially disposed pionions meshing with said ring gear.

8. The vehicle of claim 7 wherein first and second planetary gear sets are mounted on said sub-frame and wherein first and second ring gears for said first and second planetary gear sets, respectively, are attached to said sub-frame.

9. The vehicle of claim 8 wherein said first and second ring gears are attached to said sub-frame by common fastening means.

10. The vehicle of claim 9 wherein said final drive means further comprises an input shaft, a first sun gear attached to said shaft and meshing with the pinions of said first planetary gear set, another carrier having said pinions rotatably mounted thereon and a second sun gear attached to said another carrier for rotation therewith and meshing with the pinions of said second planetary gear set.

11. The vehicle of claim 10 wherein the pinions of said second planetary gear set are rotatably mounted on said first-mentioned carrier which is rotatably mounted on said sub-frame.

12. The vehicle of claim 1 wherein said final drive means comprises an input shaft rotatably mounted on said sub-frame and further comprising normally engaged braking means operatively connected to said shaft for selectively braking rotation of said shaft and said sprocket.

13. The vehicle of claim 12 wherein said braking means comprises an annular friction disc attached to an outboard end of said shaft for rotation therewith.

14. The vehicle of claim 12 wherein said braking means further comprises an annular pressure plate mounted for axial movement on said sub-frame between an outboard position compressing said disc against a stationary member attached to said sub-frame and an inboard position releasing said disc for rotation with said shaft.

15. The vehicle of claim 14 wherein said braking means further comprises spring means operatively engaging said pressure plate from urging it towards said outboard position.

16. The vehicle of claim 15 further comprising a cover plate releasably attached on an outboard side of said sub-frame and defining an annular groove on an inboard side thereof and wherein said braking means further comprises an annular piston disposed in said groove to define an annular actuating chamber, adapted to be pressurized by a hydraulic fluid, between said piston and said cover plate, said piston disposed in said groove and secured to said pressure plate for selectively moving said pressure plate to its inboard position upon pressurization of said actuating chamber.

17. The vehicle of claim 7 wherein only a single planetary gear set is mounted on said sub-frame.

18. The vehicle of claim 17 wherein said final drive means further comprises an input shaft and a sun gear attached to said shaft and meshing with the pinions of said planetary gear set.

19. The vehicle of claim 18 wherein said pinions are rotatably mounted on said carrier.

20. The vehicle of claim 19 further comprising normally engaged braking means, including an annular friction disc connected to an outboard end of said shaft for rotation therewith, for selectively braking rotation of said shaft and said sprocket.

* * * * *